April 24, 1928.
R. BEATTIE
1,667,235
APPARATUS FOR MIXING SLUDGE
Original Filed June 6, 1927
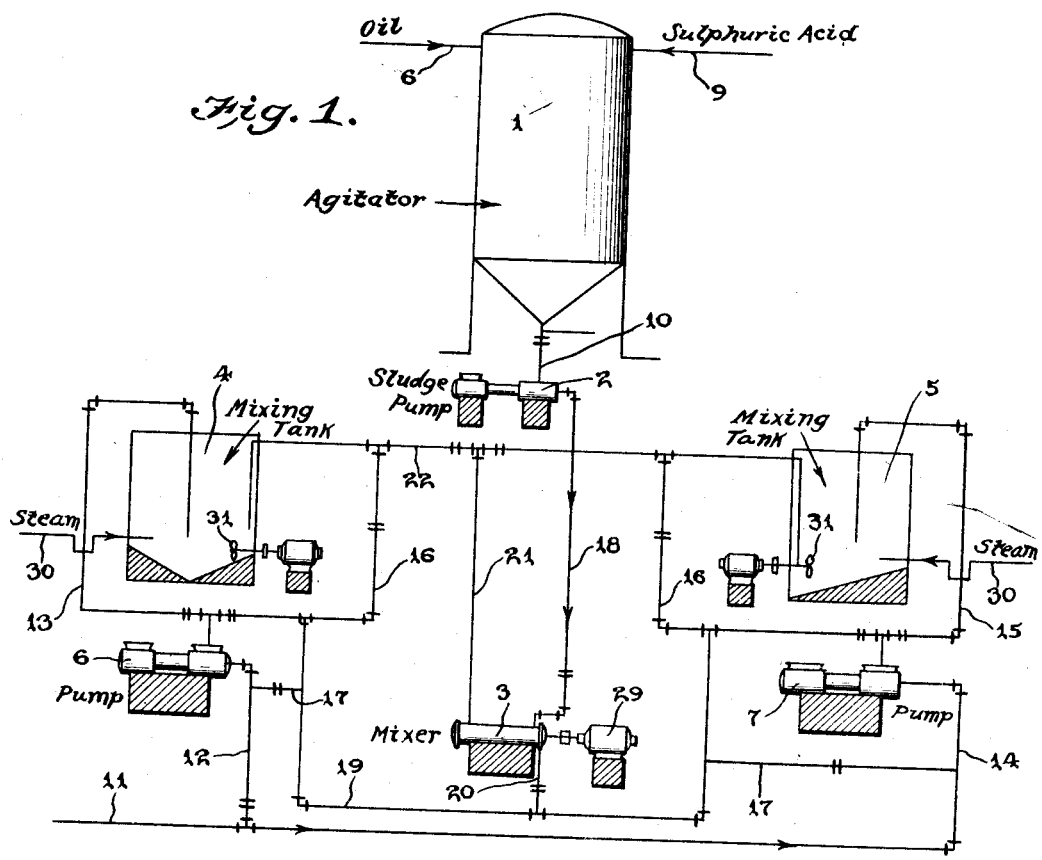
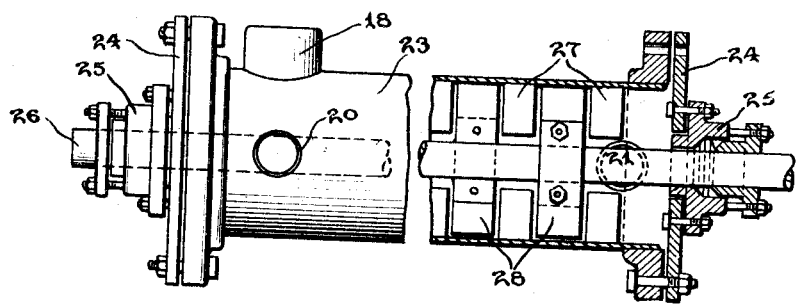
INVENTOR.
Robert Beattie
BY M. S. Meem
ATTORNEY.

Patented Apr. 24, 1928.

1,667,235

UNITED STATES PATENT OFFICE.

ROBERT BEATTIE, OF FORT WORTH, TEXAS, ASSIGNOR TO TEXAS PACIFIC COAL AND OIL COMPANY, OF FORT WORTH, TEXAS, A CORPORATION OF TEXAS.

APPARATUS FOR MIXING SLUDGE.

Original application filed June 6, 1927. Serial No. 196,901. Divided and this application filed November 29, 1927. Serial No. 236,556.

This invention relates to an improved apparatus for treating acid sludge or the like.

The apparatus is designed to mechanically mix in any desired proportions, acid sludge or other heavy residue remaining from the treatment of petroleum oils with fuel oil, gas oil or any other grade of hydrocarbons heavier than kerosene.

The present application is a division of my application Serial No. 196,901, filed June 6, 1927, which resulted in Patent No. 1,660,248, dated Feb. 21, 1928. In said patent I have fully disclosed and claimed the process with which the present apparatus is used.

The primary object of the present invention is to improve the systems heretofore used, and to furnish an apparatus capable of mechanically mixing acid sludge with fuel oil, gas oil, or the like, in such manner that a homogeneous liquid remains in which the acid is neutralized.

A further object of the invention is to provide an apparatus for mechanically agitating the acid sludge so violently that its cells are broken up during the mixing, and the acid thus released, is immediately neutralized by soda ash which has been previously mixed with gas oil, or fuel oil, which in turn, was mixed with the acid sludge.

A still further object is to furnish an apparatus which will not only mix the acid sludge and fuel oil or the like, in such manner that the acid sludge will remain in suspension, or solution, but the work will be accomplished in a comparatively short time, and the resulting mixture may be freely atomized for burning purposes.

Another object of the invention is to provide an apparatus capable of organizing acid sludge into one stream, and hydrocarbon liquid and a neutralizing agent, into another stream. The apparatus also includes a mixer forming a passageway through which the two streams are fed, and in which the streams are violently agitated to thoroughly mix the streams and produce a homogeneous liquid mixture, in which the acid is neutralized.

With the foregoing objects outlined and with other objects in view which will appear as the description proceeds, my invention consists in the novel features hereinafter described in detail, illustrated in the accompanying drawing, and more particularly pointed out in the appended claims.

Referring to the drawing,

Fig. 1 is a diagrammatic view of my improved apparatus.

Fig. 2 is an elevation, partly in longitudinal vertical section, of the mechanical mixer forming part of the invention.

The apparatus consists mainly of an agitator 1, a sludge pump 2, a mixer 3, mixing tanks 4 and 5, and pumps 6 and 7, all suitably connected by valved piping in the manner hereinafter described.

In using this apparatus, the batch of oil to be treated is pumped into the agitator through a pipe 8, and after it is brought to the desired temperature, a measured amount of sulphuric acid is introduced into the oil through a line 9. Air is then blown into the pipe 10 at the bottom of the agitator, and the resulting agitation, mixes the oil and acid. After a certain period, the air is shut off, and the sludge allowed to settle to the bottom.

As a general proposition, the oil in the agitator 1 is first treated with what is known as "cutter acid", and subsequently with "body acid", and my apparatus is designed to take care of such sequential treatments.

While the oil is being treated, or the sludge is settling in the agitator, a given amount of fuel oil, gas oil or other suitable hydrocarbon mixture, is fed through the pipe 11 by the pump 6, and passes by way of valved pipe 12, into that pump. The latter forces the liquid hydrocarbons through the valved pipe 13 into the tank 4, and the amount of liquid hydrocarbons fed into this tank will depend upon the amount of sludge obtained from the cutter acid.

If the total volume of cutter acid, sludge and fuel oil can be held in tank 4, tank 5 is charged with enough fuel oil to mix with the "body" sludge. If not, then the cutter sludge is split, part going to tank 4, and part to tank 5. In the latter instance, part of the gas oil or fuel oil will be drawn by the pump 7 through the valved pipe 14, and will be forced by the pump through the valved body 15 into the tank 5. Into these two tanks is dumped enough soda ash to completely neutralize the amount of acid in the sludge with which the fuel oil is to be mixed. While the sludge is settling in the agitator, and after the soda ash has been mixed with the fuel oil, this mixture of fuel oil and soda ash is moved around in cycles to thoroughly mix the same. To permit this, each tank and its associated pump is provided with valved pipes 16 and 17.

Assuming that the sludge has settled in the agitator by this time, the rotary mixer 3 is set in operation, and we will also assume that the mixture of fuel oil and soda ash in the tank 4 is sufficient to take care of this sludge which has resulted from the treatment of the oil with the cutter acid. Under such circumstances, the valve in the pipe 10 is opened, and the pump 2 functions to force the acid sludge from the pipe 10 through pipe 18, and into the mixer 3. At this time, the valves in the pipes 12 and 16 are closed, so that the pump 6 may force the mixture of fuel oil and soda ash through pipes 17, 19 and 20, from the tank 4 into the mixer 3, where it meets and is intermingled with the sludge from pipe 18. The mixture of soda ash, fuel oil and acid sludge is discharged from the mixer through pipe 21, and passes through pipe 22 into the tank 4.

The mixer is shown in detail in Fig. 2, and it comprises a cylinder 23 having suitable inlet and outlet ports which communicate with the pipes 18, 20 and 21. Plates 24 close the ends of the cylinder and carry suitable bearings 25 for the shaft 26. The interior of the cylinder is provided with two rows of radially disposed stationary plates 27 which are diametrically oppositely disposed, and project into close proximity with the shaft 26. Arranged between these plates and fixed on the shaft 26, are rotatable plates 28. The shaft 26 is driven by any suitable means such as an electric motor 29, and the material passing through the mixer is violently agitated, so that the resulting mixture is a homogeneous liquid, in which the acid is neutralized.

While the soda ash is being mixed with the fuel oil, steam may be introduced into the tanks through pipes 30, and this will assist in maintaining the turbulence necessary to effectively mix these materials. If desired, rotatable propellers 31 may also be used to assist this action, but the use of the propellers is not necessary.

It may be observed that the acid sludge is forced by the pump 2, while the mixture of soda ash and fuel oil is circulated by the pump 6, and this permits the sludge to be put into the mixer with sufficient pressure to overcome the pressure caused by circulating the fuel oil and soda ash. The rate of circulation of the soda ash, fuel oil is so high in comparison to the inlet rate of sludge (ratio 100 to 1), and the agitation is so violent, that the acid bearing sludge cells are ruptured, their acid released, and immediately neutralized by the presence of the soda ash carried by the fuel oil.

At the beginning of the actual mixing, a quantity of acid oil is drawn from the bottom of the agitator before the sludge comes. This oil is rich in acid which is neutralized immediately when introduced into the mixer, as the fuel oil at this step of the operation is laden with strong soda ash. As the operation progresses, the fuel oil becomes more and more sludge laden, and after all the sludge is pumped into the mixer, the sludge pump is shut down. A suitable mixture of sludge acid and fuel oil is circulated through the mixer by the pump 6, until smoothness is obtained, (freedom from sludge and coke particles).

The body sludge formed by the second acid charge is then mixed in tank 5, that is, circulated by pump 7 through the mixer. During this operation, the contents of tank 4 may be pumped to storage, and then be recharged with fuel oil or the like for the next operation. In effect, it will therefore be seen that my apparatus renders the operation substantially continuous.

The shaft of the mixer 3 is rotated at a high rate of speed so as to secure the desired result, and the operation of the mixer positively prevents the formation of any secondary sludges in the resulting mixture.

The same type of mixer may be used to work up the sludge already in storage in sludge pits at refineries.

Whenever the mixer is employed for the treatment of sludge, there is bound to be drawn to the outer wall of the cylinder 23, during the mixing process, such parts of the mixture as contains the greater percentage of sludge; this throwing out or stratification being due to centrifugal force. This is the part of the mixture then at any given moment that requires the most agitation to make the finished product homogeneous.

As it is a mathematical law that the peripheral speed is direct, dependent on the R. P. M., and the distance of point to the center of rotation, automatically, the areas farthest away from the shaft receive the most energetic agitation. It is thus evident, in the course of the ingredients through the mixer, this condition balances itself, and the resulting acid sludge fuel is homogeneous regardless of the rate of charging.

In the beginning, I tried this mixer with fuel oil, but subsequently, I have successfully used the same for mixing gas oil and sludge, which was impossible by the known method, due to the fact that the acid sludge when introduced into gas oil, even in small particles, immediately sank to the bottom of the mixing tank. Because of the mixing and disrupting action in my new system, the sludge, by the time it passed into the tank via the mixer, was in suspension in the gas oil, and readily mixed with gas oil in the tank.

While I have disclosed a working embodiment of the invention, it will be apparent to those skilled in the art that changes may be made in the details disclosed without departing from the spirit of the invention as expressed in the claims.

What I claim and desire to secure by Letters Patent is:

1. An apparatus of the character described, including a sludge tank, a mixing tank, a mixer, a sludge pump and a second pump for forcing a mixture of liquid hydrocarbons and neutralizing agent, and valved pipes connecting said elements in such manner that the second pump may circulate such mixture through the tank without passing through the mixer, and whereby both pumps may circulate the sludge and mixture through the mixer and mixing tank.

2. An apparatus of the character described, including an agitator, a pipe for discharging sludge from the agitator, a pump for forcing sludge through said pipe, a mechanical mixer to which one end of the pipe is connected, a mixing tank, a valved conduit connecting the mixer to said tank, a pump, a valved pipe connecting the pump to said tank, and a valved conduit connecting the pump to the mixer.

3. An apparatus of the character described, including a mixer, a sludge pump, a pipe for leading sludge from the pump to the mixer, a tank adapted to contain a mixture of liquid hydrocarbons and a neutralizing agent, a conduit placing the mixing tank in communication with the mixer, means for forcing the hydrocarbons and neutralizing agent through the last mentioned conduit, and a pipe for discharging the mixture from the mixer.

4. An apparatus of the character described, including a mixer, an agitator, means for introducing oil and sulphuric acid into the agitator, a sludge pump, a pipe connecting the bottom of the agitator to the sludge pump, and a pipe connecting the sludge pump to the mixer.

5. An apparatus of the character described, including a mixer consisting of a tubular casing, beating means in the casing, means for forcing acid sludge into one end portion of the casing, means for mixing liquid hydrocarbons with a neutralizing agent, means for forcing this mixture into one end portion of the tubular casing, and means for discharging material from the other end portion of the casing.

6. In an apparatus of the character described, a mixing tank, an inlet pipe, a pump for forcing liquid hydrocarbons into the mixing tank, piping connecting the pump and tank to permit the pump to circulate the liquid through the tank, a mixer, a conduit connecting said piping to the mixer to permit the pump to force material from the piping through the mixer, a sludge tank, a conduit connecting the sludge tank to the mixer, a pump for forcing sludge through the last mentioned conduit and a pipe for discharging material from the mixer.

7. An apparatus of the character described, including a mixer consisting of a tubular casing and beating means in the casing, an acid sludge supply tank, means for feeding acid sludge from the supply tank into one end portion of the casing, means for mixing liquid hydrocarbons with a neutralizing agent, means for feeding this mixture into the same end portion of the casing, and means for discharging material from the other end portion of the casing.

ROBERT BEATTIE.